(12) United States Patent
Leo et al.

(10) Patent No.: US 12,286,199 B2
(45) Date of Patent: Apr. 29, 2025

(54) OFFSHORE PRODUCTION FACILITY ARRANGEMENT

(71) Applicant: Single Buoy Moorings Inc., Marly (CH)

(72) Inventors: Jos Leo, Bât. Aigue Marine (MC); Jan Van den Boomgaard, Bât. Aigue Marine (MC); Peter Eijk, Bât. Aigue Marine (MC)

(73) Assignee: Single Buoy Moorings Inc., Marly (CH)

( * ) Notice: Subject to any disclaimer, the term of this patent is extended or adjusted under 35 U.S.C. 154(b) by 498 days.

(21) Appl. No.: 17/779,589

(22) PCT Filed: Dec. 4, 2020

(86) PCT No.: PCT/EP2020/084605
§ 371 (c)(1),
(2) Date: May 25, 2022

(87) PCT Pub. No.: WO2021/110900
PCT Pub. Date: Jun. 10, 2021

(65) Prior Publication Data
US 2023/0041653 A1    Feb. 9, 2023

(30) Foreign Application Priority Data
Dec. 5, 2019    (EP) .................................... 19213940

(51) Int. Cl.
*B63B 35/44*    (2006.01)

(52) U.S. Cl.
CPC .... *B63B 35/4413* (2013.01); *B63B 2035/446* (2013.01)

(58) Field of Classification Search
CPC ........... B63B 35/4413; B63B 2035/446; Y02E 10/30; Y02E 60/36; B63J 3/04; Y02P 20/133; Y02T 70/50; Y02T 90/40; E21B 1/00; C25B 1/04
See application file for complete search history.

(56) References Cited

U.S. PATENT DOCUMENTS

| | | | |
|---|---|---|---|
| 2002/0090868 A1 | 7/2002 | Schmitman | |
| 2007/0048137 A1* | 3/2007 | Hartman | .................. F03D 3/00 416/132 B |
| 2009/0323896 A1* | 12/2009 | Kitamura | ................. A61B 6/00 378/98.11 |

FOREIGN PATENT DOCUMENTS

| | | |
|---|---|---|
| WO | 89/02848 A1 | 4/1989 |
| WO | 2009/040442 A1 | 4/2009 |

* cited by examiner

*Primary Examiner* — Anthony D Wiest
(74) *Attorney, Agent, or Firm* — N.V. Nederlandsch Octrooibureau

(57) ABSTRACT

The invention relates to an offshore hydrocarbon production facility arrangement that is to be located on a body of water, which includes a floating hydrocarbon processing unit, a floating renewable electric energy source, and a hydrogen gas source,
wherein
the floating renewable electric energy source is configured to generate electric energy;
the hydrogen gas source is configured to produce hydrogen gas using the electric energy from the floating renewable electric energy source;
the floating hydrocarbon processing unit is configured with an electric power generator;
the electric power generator is coupled to the hydrogen gas source and is configured for receiving produced hydrogen gas as fuel gas.

11 Claims, 2 Drawing Sheets

OFFSHORE PRODUCTION FACILITY ARRANGEMENT

FIELD OF THE INVENTION

The present invention relates to an offshore production facility arrangement.

BACKGROUND

In some offshore hydrocarbon reservoirs, the production of hydrocarbons from the wells requires some operations that can be energy intensive. For example, the pressurization of wells by water/fluid injection require relatively large amounts of energy. Typically, on fixed offshore Oil and Gas Production Platforms (Platform) and floating production storage and offloading vessels (FPSO) such energy to drive the water injection pumps is produced by one or more on-board power generators using part of the hydrocarbons (gases or liquids) harvested from the wells. As a result, the hydrocarbon production is not optimal and has a relatively high carbon dioxide footprint.

Additionally, renewable electric energy sources are known such as wind turbines that transform wind energy or wave energy converters that transform wave energy into electric energy.

However, using electric energy supplied by an external source to the Platform or FPSO is difficult and costly to implement as this requires large adaptations to the power network and/or electric equipment on the Platform or FPSO.

It is an objective of the invention to overcome or mitigate the disadvantages of the prior art.

SUMMARY OF THE INVENTION

The objective is achieved by an offshore hydrocarbon production facility arrangement to be located on a body of water, which arrangement comprises a hydrocarbon processing unit, a floating renewable electric energy source, and a hydrogen gas source,
wherein the floating renewable electric energy source is configured to generate electric energy; the hydrogen gas source is configured to produce hydrogen gas using the electric energy; the floating hydrocarbon processing unit is configured with an electric power generator; the electric power generator is coupled to the hydrogen gas source and is configured for receiving produced hydrogen gas as fuel gas.

By providing hydrogen generated by a renewable energy source as fuel gas in the power generators of the Platform or FPSO less hydrocarbons are consumed and the CO2 footprint of the Platform or FPSO is reduced accordingly. It is observed that hydrogen can be mixed with hydrocarbons to significant levels as a suitable fuel gas for gas turbines and/or piston combustion engines. In this manner, the usage of harvested hydrocarbons for power generation (and corresponding CO2 exhaust) is reduced by the addition of hydrogen gas to the fuel for the power generator.

According to an embodiment, the hydrogen gas is created by electrolysis of source water using an electrolyser system. Preferably, the source water is created from sea water (bulk water) that is filtered, purified and demineralised by a water treatment system to a level that the electrolysis reaction to create hydrogen gas from water can take place.

According to an embodiment, the hydrogen gas production is carried out on a substation that can be located either on a platform on the floating wind turbine, or on-board the Platform or FPSO, or on a substation that is separated from both the wind turbine and the Platform or FPSO.

If the hydrogen is produced remotely from the Platform or FPSO, a hydrogen feeding conduit is provided between the hydrogen gas source and the Platform or FPSO. In an embodiment, where the FPSO is turret moored using a mooring buoy placed in a moonpool of the FPSO, the hydrogen feeding conduit can be a riser entering the FPSO through the turret mooring system.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept. The scope of the invention is only limited by the definitions presented in the appended claims.

DETAILED DESCRIPTION OF EMBODIMENTS

Figure 1:
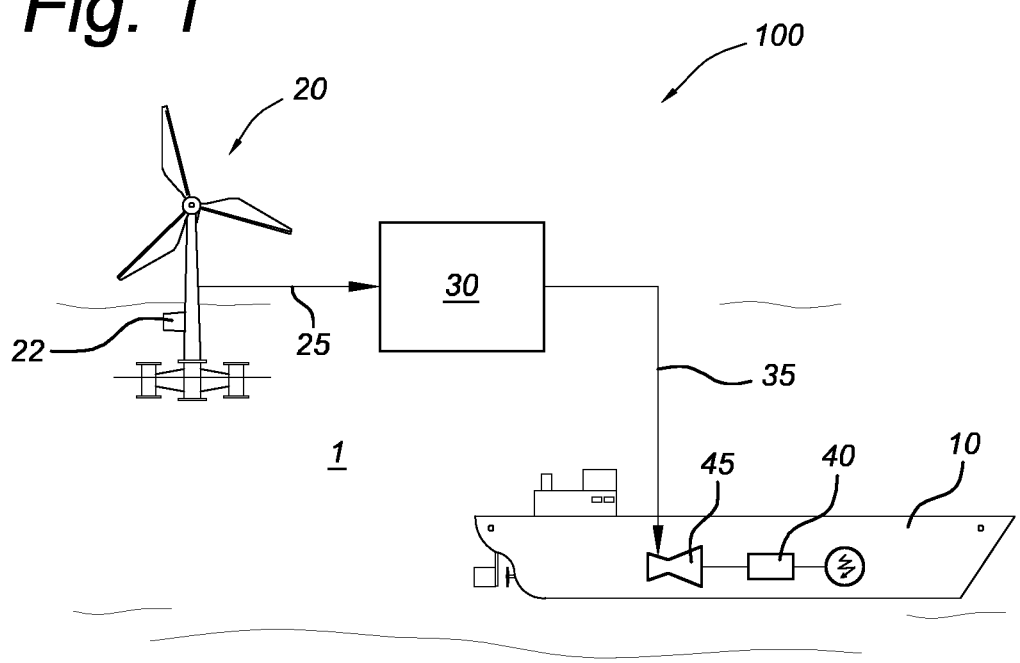
FIG. 1 schematically shows an offshore hydrocarbon production facility arrangement in accordance with an embodiment of the invention.

Embodiments of the present invention will be described hereinafter, by way of example only, with reference to the accompanying drawings which are schematic in nature and therefore not necessarily drawn to scale. In the drawings, identical or similar elements are indicated by the same reference sign.

FIG. 1 schematically shows an offshore hydrocarbon production facility arrangement 100 in accordance with an embodiment of the invention.

The offshore hydrocarbon production facility arrangement 100 according to the invention is located on a body of water 1, such a sea or a lake. The arrangement comprises a floating hydrocarbon processing unit 10, a floating renewable electric energy source 20, and a hydrogen gas source 30.

The floating renewable electric energy source 20 which can be a floating wave energy converter or preferably a floating wind turbine (or a group of wind turbines) is configured to generate electric energy from the energy provided by the environment, i.e., from wave energy or wind flow.

The floating wave energy converter and the floating wind turbine are known from the prior art.

The floating renewable electric energy source 20 is electrically connected 25 to the hydrogen gas source 30 that is configured to produce hydrogen gas using the electric energy from the floating renewable electric energy source. In an embodiment, the hydrogen gas source 30 comprises an electrolyser device to create hydrogen from source water 1. The electrolyser is based on the electrolysis of water: the reaction to dissociate water molecules in hydrogen gas and oxygen gas under supply of electric energy. In the electrolyser the hydrogen gas is collected separately from the oxygen gas.

The electrolyser can be based on various electrolyser cell types, such as solid oxide electrolysis cell, polymer electrolyte membrane cell and alkaline electrolysis cell. In a preferred embodiment, the electrolyser is based on polymer electrolyte membrane cell as this can operate at relatively low temperature at relatively high efficiency.

The hydrogen gas source 30 has an output conduit 35 for the hydrogen gas that is connected to an input for fuel gas of an electric power generator 40, 45 that is located on the floating hydrocarbon processing unit 10. The electric power generator 40, 45 is configured to supply electric power to hydrocarbon production equipment on board the hydrocarbon processing unit 10. The electric power generator 40,45 can comprise a gas turbine 40 that in use drives an electromagnetic generator 45. Alternatively the electric power generator can comprise a piston engine or other type combustion engine as driver 40.

According to an embodiment, the hydrogen gas is supplied to the power generator in a mixture with hydrocarbon fuel gas, obtained from the hydrocarbon production process on the Platform or FPSO.

Depending on local circumstances, the hydrogen gas source 30 can be located on a platform on the floating wind turbine 20. Alternatively, the hydrogen gas source 30 can be located on the Platform or FPSO. As a further alternative, the hydrogen gas source 30 can be located on a separate substation on either a floating or fixed platform.

The Platform or FPSO is configured for harvesting hydrocarbons from one or more wells in a reservoir (not shown) below the sea bed/lake bed. The operation of the Platform or FPSO is known to the skilled in the art.

The output conduit 35 for transfer of produced H2 from the electrolyser 30 to the offshore hydrocarbon production unit 10 like a Platform or an FPSO, could have a length of several kilometres with an H2 pressure that could be in the range of 10 to 100 bar.

Figure 2:
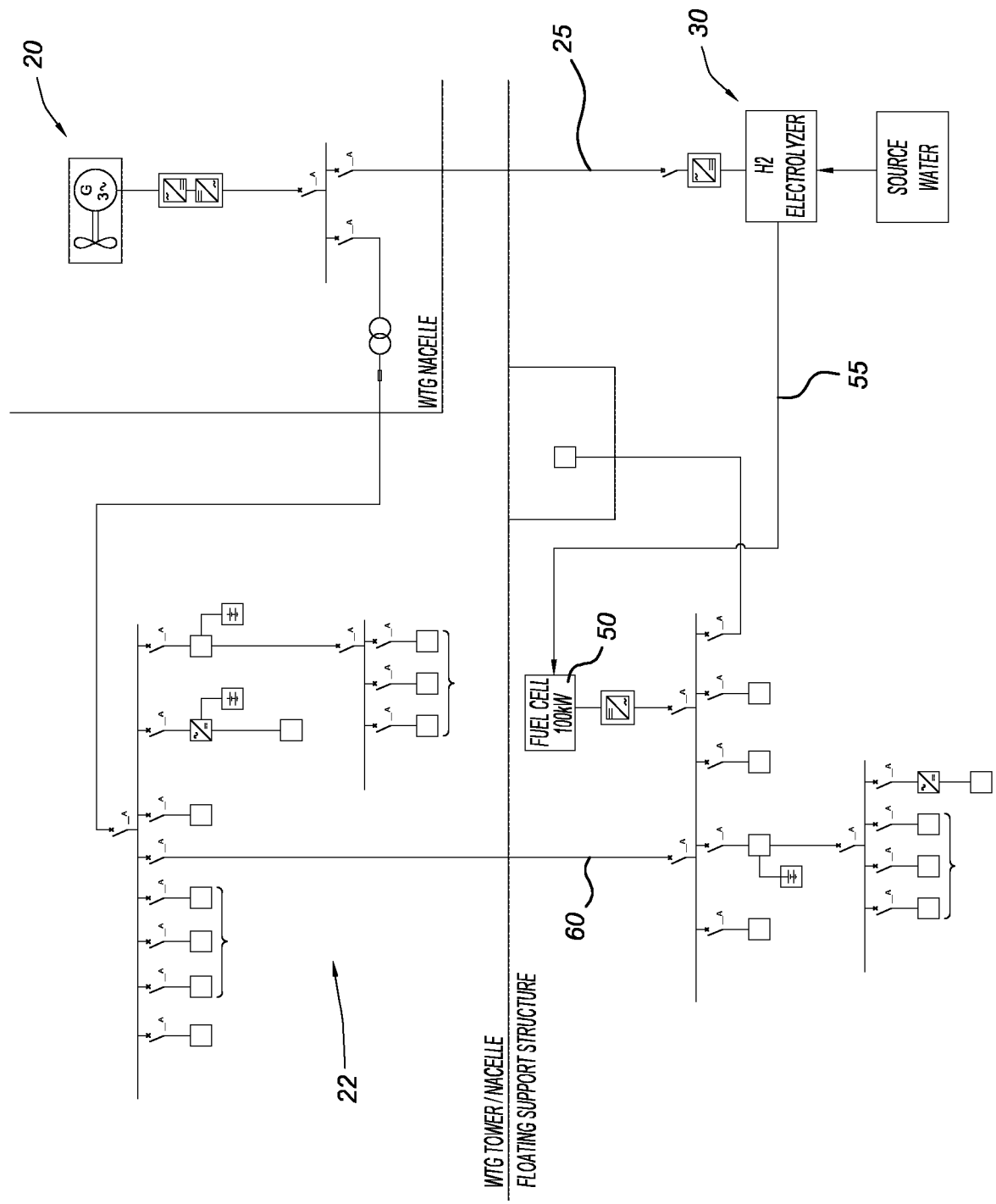
FIG. 2 shows a schemati layout of the arrangement in which the electric connection between the wind turbine and the electrolyzer equipment, the hydrogen gas line between the electrolyser equipment and the small power generator or fuel cell and the input of source water into the electrolyser equipment are shown FIG. 3 schematically shows an hydrogen gas production source in accordance with an embodiment of the invention.

FIG. 2 shows a schematic layout of the arrangement in which the electric connection between the wind turbine and the electrolyzer equipment, the hydrogen gas line between the electrolyser equipment and the small power generator or fuel cell and the input of source water into the electrolyser equipment are shown.

For starting-up operation of the Floating Offshore Wind Turbine unit (FOWT) 20 or after it 20 has tripped or after a complete windless situation, auxiliary equipment 22 to the FOWT is in need to have a few kilowatts of energy (in the order of about 100 kW max) just to allow start-up. Accordingly, the arrangement 100 comprises a fuel cell 50 or an auxiliary power generator 50 (of the desired power level) that is to be fed with H2 from the electrolyser 30 and that is configured to supply electric power to the auxiliary equipment 22 for assisting the start-up of the FOWT 20.

A transfer line 55 for hydrogen runs between the electrolyser 30 and the fuel cell or small power generator 50 in addition to the hydrogen gas supply 35 (not shown here) that runs between the electrolyser and the power generator on the platform or FPSO.

In case of a shutdown/start of the FOWT 20, pressurized H2 in the transfer line is therefore used for "line packing" or buffer purposes: pressurized H2 is routed back to feed the small power generator or the fuel cell which could be used for black start of the auxiliary equipment on the deck and the nacelle. The fuel cell/small power generator is preferably located close to the electrolyser (for example on the same deck). The deck holding the electrolyser 30 can be located on a platform of the FOWT 20. Alternatively, the electrolyser 30 is on a substation that also holds the fuel cell or the small power generator 50. From the fuel cell or the small power generator 50 an auxiliary power line 60 runs to the auxiliary equipment 22 for supplying the electric power.

According to an embodiment, a floating wind turbine comprises a wind turbine, auxiliary electric equipment to start-up or control the wind turbine, an electrolyser and a fuel cell, in which the wind turbine is electrically coupled to the electrolyser for supplying electric energy for electrolysis; the electrolyser is coupled to the fuel cell by a pressurized hydrogen gas supply line, and the fuel cell has an electric output to the auxiliary electric equipment for supply electric power. The pressurized hydrogen gas supply line provides a hydrogen buffer to supply hydrogen to the fuel cell in case the auxiliary electric equipment is in need of electric energy.

Figure 3:
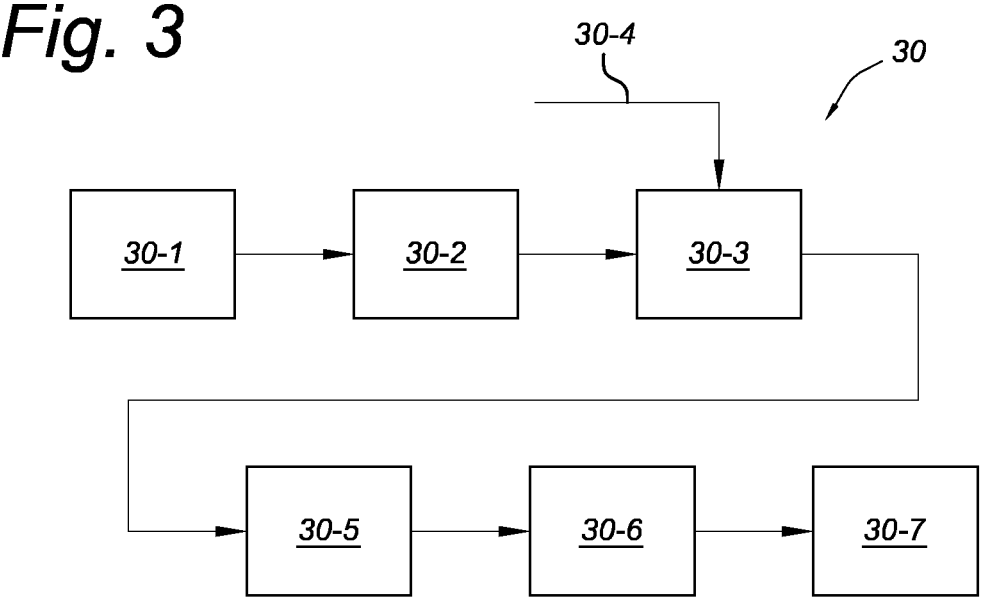

FIG. 3 schematically shows an hydrogen gas production source 30 in accordance with an embodiment of the invention.

The hydrogen gas production source is configured to produce hydrogen from source water 1 that is supplied to the electrolyser 30. According to the invention, the source water is prepared from bulk water by means of a water treatment process.

To this end, the hydrogen gas production source 30 has an intake line that comprises filtration 30-1, reversed osmosis and purification 30-2 devices. At the entry of the intake line, the bulk water is guided through coarse and fine filters to remove any objects and particles from the water. After passing the filters, the water is treated in a purification station to demineralize the water to a purity level suitable for the electrochemical reaction to dissociate water into hydrogen gas and oxygen gas. In an electrolysis cell 30-3 hydrogen gas and oxygen gas are created using electric energy 30-4 from the floating wind turbine or wave energy converter. The hydrogen gas is separated 30-5 from the oxygen and collected for transport 30-7. In an optional next stage, the hydrogen gas is supplied to a compressor for compressing 30-6 the hydrogen gas before transporting the hydrogen to the gas turbine/piston engine of the power generator.

Alternative to a direct gas supply to the power generator by gas line 35, the hydrogen gas production source may be configured with a storage buffer (not shown here) in which hydrogen gas is temporarily stored before transport to the power generator 40, 45.

The invention has been described with reference to some embodiments. Obvious modifications and alterations will occur to the person skilled in the art upon reading and understanding the preceding detailed description. It is intended that the invention be construed as including all such modifications and alterations insofar as they come within the scope of the appended claims.

The invention claimed is:

1. Offshore hydrocarbon production facility arrangement to be located on a body of water, comprising a floating hydrocarbon processing unit, a floating renewable electric energy source, and a hydrogen gas source, wherein the floating renewable electric energy source is configured to generate electric energy;

the hydrogen gas source is configured to produce hydrogen gas using the electric energy from the floating renewable electric energy source;

the floating hydrocarbon processing unit is configured with an electric power generator;

the electric power generator is coupled to the hydrogen gas source and is configured for receiving the produced hydrogen gas as fuel gas.

2. The arrangement according to claim 1, wherein the floating renewable electric energy source comprises a floating wind turbine for generating the electric energy.

3. The arrangement according to claim 1, wherein the hydrogen gas source comprises an electrolyser system for producing the hydrogen gas from source water using the electric energy, wherein the electrolyser system is electrically connected to the floating renewable electric energy source.

4. The arrangement according to claim 3, wherein the electrolyser system comprises one or more electrolyser devices based on a cell type selected from a group comprising solid oxide electrolysis cell, polymer electrolyte membrane cell and alkaline electrolysis cell.

5. The arrangement according to claim 4, wherein the electrolyser system is equipped with a water treatment system configured for producing source water from the body of water, the water treatment system comprising devices for at least filtration, reversed osmosis and water purification.

6. The arrangement according to claim 1, wherein the hydrogen gas source is arranged either:

on a platform of the floating renewable electric energy source, or on a substation separate from the floating renewable electric energy source and the floating hydrocarbon processing unit, or on board the floating hydrocarbon processing unit.

7. The arrangement according to claim 1, wherein the hydrogen gas source is equipped with a compressor for compressing the produced hydrogen gas before supplying the produced hydrogen gas to the electric power generator.

8. The arrangement according to claim 1, wherein the electric power generator is configured for receiving the produced hydrogen gas mixed with hydrocarbon-based gas.

9. The arrangement according to claim 1, wherein the hydrogen gas source comprises a hydrogen gas storage buffer.

10. The arrangement according to claim 1, wherein the floating hydrocarbon processing unit is a vessel comprising a turret mooring system, and the hydrogen gas is transported from the hydrogen gas source to the hydrocarbon processing unit via a riser entering through the turret mooring system.

11. The arrangement according to claim 1, wherein the floating renewable energy source comprises auxiliary electric equipment; the hydrogen gas source is additionally coupled to a fuel cell or second power generator by a pressurized hydrogen gas line, and the fuel cell or second power generator is electrically connected to the auxiliary equipment for supplying electric power to the auxiliary equipment.

* * * * *